United States Patent
Bangs et al.

[11] 3,784,371
[45] Jan. 8, 1974

[54] CORROSION RESISTANT FROZEN WALL

[75] Inventors: Leigh B. Bangs; James O. Huml; Gilbert S. Layne, all of Midland, Mich.

[73] Assignee: The Dow Chemical Company, Midland, Mich.

[22] Filed: Dec. 27, 1971

[21] Appl. No.: 212,367

Related U.S. Application Data
[63] Continuation of Ser. No. 159, Jan. 2, 1970, abandoned.

[52] U.S. Cl............................................. 75/68 R
[51] Int. Cl........................................... C22b 21/04
[58] Field of Search..................... 75/68 R, 68 B, 63

[56] References Cited
UNITED STATES PATENTS

| | | | |
|---|---|---|---|
| 2,184,705 | 12/1939 | Willmore | 75/68 R |
| 2,271,023 | 1/1942 | Nelson | 75/63 X |
| 2,470,305 | 5/1949 | Gross | 75/63 X |
| 2,720,456 | 10/1955 | Davey | 75/63 X |
| 2,724,644 | 11/1955 | Mathieu | 75/68 Rx |
| 3,136,627 | 6/1964 | Caldwell et al. | 75/63 |
| 3,397,056 | 8/1968 | Layne et al. | 75/68 B |
| 3,477,812 | 11/1969 | Huml et al. | 75/68 R X |

FOREIGN PATENTS OR APPLICATIONS
734,480   8/1955   Great Britain..................... 75/68 B

*Primary Examiner*—L. Dewayne Rutledge
*Assistant Examiner*—M. J. Andrews
*Attorney*—William R. Norris

[57] ABSTRACT

Highly corrosive molten or vaporous halometaliferous systems comprising metals and metal halides are confined by heat transferring walls on which a frozen layer of the highest melting component of the system is maintained as a protective coating. The confining walls are in essence composites which, in transverse cross-section, consist of a thermally conductive structural wall member having an adherent solid layer of the highest melting component of the confined system. The structural member is continuously cooled sufficiently to maintain its temperature below the melting point of the adhering solid layer. In one embodiment of the invention, the protected walls are employed as heat exchanging surfaces on which vaporous mixtures of metal halides and metal vapors are condensed.

4 Claims, 1 Drawing Figure

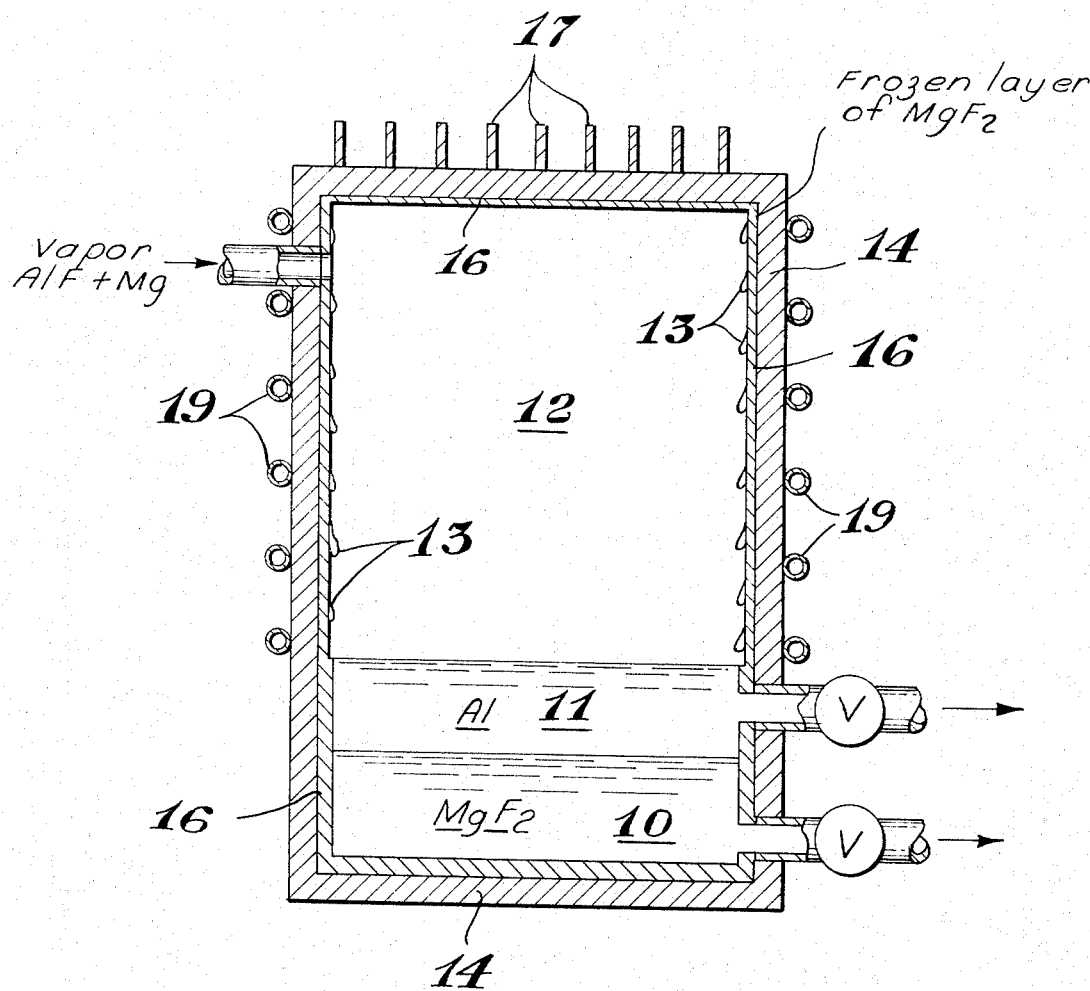

CORROSION RESISTANT FROZEN WALL

This is a continuation, of U.S. Pat. application Ser. No. 000,159, filed Jan. 2, 1970, now abandoned.

A need exists in respect of such metal purification processes as are described by Willmore, U.S. Pat. No. 2,184,705; Phillips and Southam, U.S. Pat. No. 3,384,475; and Layne and Huml, U.S. Pat. No. 3,397,056 to provide corrosion resistant vessels for the confining of highly corrosive halometalliferous systems.

It is an object of the instant invention to provide a technique for confining relatively high melting and boiling halometalliferous systems.

A particular object is to provide a frozen wall condenser for aluminum halide and volatile metal vapors.

A further object, with reference to the abovementioned condenser, is to provide a condensing surface resistant to corrosion by the condensation products.

Still another object is to provide vessel walls for containing the molten condensation products of aluminum halides and one or more volatile metal vapors.

In the practice of the instant invention, the above objects, and other benefits as will become apparent hereinafter, are achieved by providing confining wall members of conduits and vessels employed to transport, condense and contain halometalliferous systems comprising a metal and a metal halide in the form of frozen walls. These walls comprise, in cross-section, a structural thermally conductive wall member and an adherent, frozen (solid) layer of the highest melting component of the halometalliferous system. Halometalliferous systems to which the invention is particularly well adapted comprise aluminum, a volatile alkali or alkaline earth metal and a halide of at least one of these metals. In the described halometalliferous systems, the highest melting component will usually be a halide salt of the volatile metal. Best results are achieved when the inner surface of the structural wall member is preferentially wet by the highest melting component of the system, i.e., the highest melting component will displace other liquid ingredients of the halometalliferous system on the surface of the structural wall member.

To maintain the frozen wall, the one surface of the structural wall member is cooled sufficiently to maintain the other surface thereof below the melting point of the frozen solids. Depending upon the rate or the degree of cooling, the adherent solid layer is maintained at a thickness, e.g., from about 0.5 up to about 1,000 millimeters, sufficient to protect the structural wall member from reaction with, or corrosion by, components of the halometalliferous system contacted by such a wall.

The accompanying drawing schematically depicts utilization of frozen walls in a condenser for a totally condensable system of corrosive halometalliferous vapors and confining the liquid products thereof. The basic reaction occurring within the depicted condenser is shown by the equation: $2AlF(g) + Mg(g) \rightarrow 2Al(l) + MgF_2(l,s)$.

In the drawing, the total condenser comprises a tank 14. The structural walls of the tank 14 are of a heat conducting material, which is preferentially wet by magnesium fluoride ($MgF_2$) relative to aluminum (Al). Graphite is such a material. The inside surface of the tank is coated with an adherent frozen layer 16 of $MgF_2$. The frozen layer 16 is maintained by cooling the structural walls of the tank with such cooling means as the heat radiating fins 17 shown on the top of the tank and the water-cooled heat exchange coils 19 shown encircling the sides of the tank 14 adjacent to the vapor zone 12. In the liquid zone, sufficient heat radiates through the walls of the tank 14 to build up a continuation of the protective frozen layer 16 adjacent to the liquid aluminum 11 and $MgF_2$ 10 phases. It will be noted that the frozen wall 16 has been depicted as having varying thicknesses depending upon the efficiency of cooling means applied to the adjacent structural wall member and the physical nature of the confined halometalliferous system.

The frozen layer 16 is maintained in practice by cooling the structural walls of the tank 14 sufficiently that their inner surface is below the melting point of the highest melting component of the condensation product of the incoming vapor. In the specific embodiment chosen for illustration, aluminum fluoride and magnesium enter as vapors and, upon condensation, revert to free aluminum and magnesium fluoride liquid phases. Since magnesium fluoride has a higher melting temperature (about 1,265° C.) than aluminum, (660° C.) it is readily selectively solidified and maintained as a protective frozen layer 16 on the inside of the tank 14. Depending upon the particular confined zone, i.e., liquid or vapor, the heat flux in different parts of the tank, and the efficiency of the adjacent cooling means, the protective magnesium fluoride layer will vary in thickness throughout the tank. A thicker layer can be assured by providing for more rapid heat removal from the outside surface of the tank 14. When stabilized operation is achieved, i.e., when the incoming heat flux is equal to the heat removed by heat transfer means, the vapor facing surface of the frozen magnesium fluoride will comprise a thin liquid layer on which aluminum and additional magnesium fluoride condense as liquids 13. In the illustrated total condenser, these liquids are collected and allowed to segregate into immiscible magnesium fluoride and aluminum phases 10 and 11, which are withdrawn from the condenser through separate outlets.

Any cooling means can be employed to effect the heat removal from the structural wall adjacent to the frozen layer. In addition to the illustrated radiation and cooling coil heat transfer means, such materials can be in direct contact with a relatively cooler medium including vapors, liquids and solids. In the latter event, large masses of solid metal may be utilized to conduct heat to remote radiating surfaces.

Structural wall members may be constructed of any material which retains sufficient strength at the temperature of operation to retain structural integrity. Suitable materials of construction for the halometalliferous systems, particularly those which are preferentially wet by metal salts relative to aluminum as described above, include for example, graphite, silicon carbide and titanium carbide. On each of these materials, the fused salt condensate of the halometalliferous systems contemplated herein, forms an adherent solid coating to produce a highly corrosion resistant surface.

Although most applications of the instant invention will involve protecting inside walls of vessels, the technique is equally applicable to protecting outside walls of vessels in contact with halometalliferous systems. For instance, one mode of effecting condensation of halometalliferous systems involves introducing a "cold finger" condensation surface into a vapor zone. In this case the frozen wall would be developed on the outside surface of the "cold finger" by cooling of its inside surface.

What is claimed is:

1. A method of condensing halometallifereous vapor comprising aluminum monofluoride and magnesium by contacting such vapor with a condenser wall member characterized in cross section as comprising a structural wall member and an adherent frozen layer of essentially magnesium fluoride, said adherent layer being maintained by cooling one surface of the structural wall member sufficiently to remove the heat evolved on condensation of the halometalliferous system and to maintain the other surface of the structural wall member having the adherent frozen layer at a temperature below the melting point of magnesium fluoride, said surface of the structural wall member having the adherent frozen layer being of a material selected from the group consisting of graphite, silicon carbide and titanium carbide.

2. A method as in claim 1 and including the additional step of collecting the condensate in a vessel, the walls of which are protected by a frozen layer of magnesium fluoride produced upon condensation of the halometalliferous vapors.

3. The method of claim 1 wherein said structural wall member is preferentially wet by the metal halide relative to aluminum.

4. The method of claim 1 including maintaining the frozen layer at a thickness within the range of from about 0.5 to about 1,000 millimeters.

* * * * *